(12) United States Patent
Yamamoto et al.

(10) Patent No.: US 8,783,963 B2
(45) Date of Patent: Jul. 22, 2014

(54) WHEEL BEARING APPARATUS FOR A VEHICLE

(75) Inventors: Kazunari Yamamoto, Iwata (JP); Nobukatsu Uchiyama, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 13/091,230

(22) Filed: Apr. 21, 2011

(65) Prior Publication Data

US 2011/0194797 A1 Aug. 11, 2011

Related U.S. Application Data

(63) Continuation of application No. PCT/JP2009/005506, filed on Oct. 21, 2009.

(30) Foreign Application Priority Data

Oct. 23, 2008 (JP) .................................. 2008-272941

(51) Int. Cl.
*F16C 13/00* (2006.01)
(52) U.S. Cl.
USPC .......................................................... 384/544
(58) Field of Classification Search
USPC .................... 384/543, 544, 586, 589
See application file for complete search history.

(56) References Cited

U.S. PATENT DOCUMENTS

| 5,443,316 | A | * | 8/1995 | Deane et al. | 384/485 |
| 5,853,250 | A | * | 12/1998 | Krude et al. | 384/544 |
| 6,575,637 | B1 | * | 6/2003 | Tajima et al. | 384/544 |

FOREIGN PATENT DOCUMENTS

| JP | 60-31513 | 3/1985 |
| JP | 5-38409 | 5/1993 |
| JP | 2002-275651 | 9/2002 |
| JP | 2003-214441 | 7/2003 |
| JP | 2005-195061 | 7/2005 |
| JP | 2007-069746 | 3/2007 |
| JP | 2007-307933 | 11/2007 |
| JP | 2007-314138 | 12/2007 |
| JP | 2008-013072 | 1/2008 |

* cited by examiner

*Primary Examiner* — James Pilkington
(74) *Attorney, Agent, or Firm* — Harness, Dickey & Pierce, P.L.C.

(57) ABSTRACT

A vehicle wheel bearing apparatus has an outer member, an inner member and double row rolling elements. A wheel mounting flange is integrally formed on a driving side of the inner member for mounting a wheel via a brake rotor. Through apertures are formed on the wheel mounting flange. Hollow pins, having a chamfered portion, are press-fit into the through apertures. The brake rotor is formed with insert apertures to receive the pins, at positions respectively corresponding to the hub bolts and pins. The brake rotor can be temporarily mounted on the wheel mounting flange by inserting or press-fitting the chamfered end sides of the pins into the insert apertures.

18 Claims, 7 Drawing Sheets

(a)　　　　　　　　(b)

(a)  (b)

(a)  (b)

WHEEL BEARING APPARATUS FOR A VEHICLE

CROSS-REFERENCE TO RELATED APPLICATIONS

This application is a continuation of International Application No. PCT/JP2009/005506, filed Oct. 21, 2009, which claims priority to Japanese Application No. 2008-272941, filed Oct. 23, 2008. The disclosures of the above applications are incorporated herein by reference.

FIELD

The present disclosure relates to a vehicle wheel bearing apparatus that supports a wheel of a vehicle, such as an automobile and, more particularly to a wheel bearing apparatus that can easily temporarily mount, in a short period of time, a brake rotor on a wheel mounting flange of a wheel hub and thus improves manufacturing efficiency.

BACKGROUND

In vehicle wheel bearing apparatus that supports a wheel of a vehicle, such as an automobile, it is conventional to mount a brake rotor on a wheel mounting flange of a wheel hub together with a wheel. The mounting of the brake rotor on the wheel mounting flange is usually carried out by an automobile manufacturer to which the wheel bearing apparatus are delivered. Recently, the wheel bearing apparatus is delivered to the automobile manufacturer after the brake rotors have been temporarily mounted on the wheel mounting flange of the bearing apparatus by a bearing manufacturer. In such a case, the brake rotor is usually delivered to the automobile manufacturer being screwed onto the wheel mounting flange.

However, according to such a temporary mounting method where screws are used, not only are screws required for the temporal mounting but threaded apertures are required for the temporary mounting screws on both the brake rotor and the wheel mounting flange. This reduces the manufacturing efficiency and increases time and work for the temporal mounting. Thus, the manufacturing cost increases since the temporary mounting screws have to be screwed into both the threaded apertures of the brake rotor and the wheel mounting flange after having aligning the threaded apertures.

FIG. 9 is one example of a wheel mounting apparatus of the prior art. The wheel bearing apparatus 50 includes an inner member 54 with a wheel hub 52 and an inner ring 53. The wheel hub 52 is integrally formed with a wheel mounting flange 51 at its one end for mounting a wheel (not shown). The wheel hub 52 has one inner raceway surface 52a on its outer circumference. A cylindrical portion 52b axially extends from the inner raceway surface 52a. A serration 52c is formed on its inner circumference for torque transmission purposes. The inner ring 53 is formed with the other inner raceway surface 53a on its outer circumference. An outer member 55 is integrally formed on its outer circumference with a flange 55b that is to be mounted on a body (not shown) of a vehicle. The outer member inner circumference includes double row outer raceway surfaces 55a, 55a. Double row balls 57, 57 are rollably held equidistantly between the inner and outer raceway surfaces by cages 56, 56. A plurality of hub bolts 58 are securely mounted on the wheel mounting flange 51 equidistantly along the flange periphery. The inner ring 53 is axially immovably secured on the wheel hub 52 by a caulked portion 52d. The caulked portion 52d is formed by plastically deforming the end of the cylindrical portion 52b radially outward.

Seals 59, 60 are arranged on both ends of the outer member 55. The seals 59, 60 seal annular spaces formed between the inner and outer members 54, 55. The seals 59, 60 prevent leakage of lubricating grease contained within the bearing and the entry of rain water or dust into the bearing from the outside.

In such a wheel bearing apparatus, a through aperture 51a is formed on the wheel mounting flange 51 of the wheel hub 52. Pins 61, each forming a projecting portion, are press-fit and insert into apertures 62a, each forming an insert portion, formed on the brake rotor 62. The brake rotor 62 can be temporally mounted on the wheel mounting flange 51 by inserting the forward ends of the pins 61 into the insert apertures 62a. Thus, this prevents the rotor from coming off the wheel mounting flange 51. Accordingly, the wheel bearing apparatus 50, with the brake rotor 62 temporarily mounted on the wheel mounting flange 51, can be simply obtained in a short time by positioning the insert apertures 62a of the brake rotor 62 oppositely to the pins 61. The brake rotor 62 is pushed against the wheel mounting flange 51. See, Japanese Laid-open Patent Publication No. 069746/2007.

However, in the prior art wheel bearing apparatus 50, problems exist. It is believed that a rotational balance of the wheel hub 52 would be upset when the number of the pins 61 does not correspond to the number of hub bolts 58. It is believed that the wheel mounting flange 51 would be deformed when the pins 61 are press-fit into the through apertures 51a of the wheel mounting flange 51. Thus, the accuracy of the surface run-out of the outer side surface 51b of the wheel mounting flange 51, on which the brake rotor 62 is laid, would be reduced. This results in the generation of brake judder. It is believed that the brake rotor 62 would be lifted and thus come out from the wheel mounting flange 51 if a shearing force is applied to the pins 61 by the brake rotor 62. This occurs when the chamfered tip end 61a of any pin 61 does not perfectly projected from the outer side surface of the brake rotor 62 and remains in the insert aperture 62a. It is believed that any pin 61 would be broken when a shearing force is applied to the pin 61 by the brake rotor 62 during driving of a vehicle.

SUMMARY

It is, therefore, an object of the present disclosure to provide a vehicle wheel bearing apparatus that can easily temporarily mount, in a short period of time, a brake rotor on a wheel mounting flange of a wheel hub. Thus, this improves the manufacturing efficiency and reliability of the wheel bearing apparatus. Additionally, it assures the accuracy of the wheel mounting flange and the strength of the pins.

A vehicle wheel bearing apparatus comprises an outer member integrally formed, on its inner circumference, with double row outer raceway surfaces. An inner member is formed, on its outer circumference, with double row inner raceway surfaces. The double row inner raceway surfaces are arranged opposite to the double row outer raceway surfaces. Double row rolling elements are rollably contained, via cages, between the double row inner and outer raceway surfaces of the inner member and the outer member. A wheel mounting flange is integrally formed on a driving side of the inner and outer member to mount a wheel, via a brake rotor. A cylindrical pilot portion extends toward the outer side from the base of the wheel mounting flange. The pilot portion guides and supports the brake rotor. Through apertures are formed in order to temporarily mount the brake rotor on the wheel mounting flange. Hollow pins to temporarily mount the brake motor, having a chamfered portion, are press-fit into the mounting flange.

The through apertures are formed in order to temporarily mount the brake rotor on the wheel mounting flange. The hollow pins to temporarily mount the brake rotor, with chamfered end sides, are press-fit into the apertures. Thus, it is possible to hold the brake rotor in a rotation arresting condition relative to the wheel mounting flange. This is accomplished by inserting the through apertures of the brake rotor onto the hub bolts. The pins insert or press-fit easily and in a short period of time into the insert apertures. This is due to the provision of a chamfered portion on each pin. Thus, this prevents the brake rotor from coming off of the wheel mounting flange. In addition, since the pins are formed as hollow members, it is possible to suppress the press-fitting force. Thus, this prevents the deformation of the wheel mounting flange during press-fitting of the pins. This assures the accuracy of the surface run-out of the wheel mounting flange.

A plurality of hub bolts are press fit onto the wheel mounting flange equidistantly along its outer periphery. The brake rotor is temporarily mounted on the wheel mounting flange. The brake rotor can be formed with through apertures to receive the hub bolts of the wheel mounting flange and at least one insert aperture, receiving the at least one pin. The through apertures and the insert aperture are at positions respectively corresponding to the hub bolts and pin. The chamfered end side of the at least one pin is inserted or press-fit into the at least one insert aperture.

The number of the pins corresponds to the number of the hub bolts. Each pin is press-fit at a position away from the hub bolt by the same phase angle. This makes it possible to prevent the upset of rotational balance of the wheel hub. Thus, this improves the rotational accuracy.

The same chamfered portions are formed on both ends of each pin. This makes it possible to press-fit the pin into the wheel mounting flange without paying attention to the direction of the pin. Thus, this simplifies the press-fit operation of the pin. The pins are hardened by heat treatment. This makes it possible to prevent wear of the pins. Thus, this increases the pins mechanical strength.

A chamfered portion is formed on each insert aperture of the brake rotor at its inner side. The dimensions are set so that a depth of the chamfered portion is smaller than a depth from the outer side surface of the wheel mounting flange to the chamfered portion of the pin. This makes it possible to support the shearing force applied to the pin from the brake rotor by the cylindrical surfaces of the pin. Thus, this prevents the generation of component force causing lift of the brake rotor from the wheel mounting flange. Accordingly, it is possible to obtain a stable temporary mount of the brake rotor without the brake rotor coming off from the wheel mounting flange.

The pins are spring pins each having an axially extending slit. This makes it possible to prevent deformation of the wheel mounting flange during press-fitting of pins. Additionally, this enables easy insertion or press-fitting of the pins into the insert apertures of the brake rotor in a short period of time. In addition, it is also possible to reduce the manufacturing cost by adopting standard articles.

The pins are formed from a blank of a pipe member. The pins are formed from stainless steel. The surface of the pins is phosphate treated.

The vehicle wheel bearing apparatus of the present disclosure comprises an outer member integrally formed on its inner circumference with double row outer raceway surfaces. An inner member is formed, on its outer circumference, with double row inner raceway surfaces. The inner raceway surfaces are arranged opposite to the double row outer raceway surfaces. Double row rolling elements are rollably contained, via cages, between the double row inner and outer raceway surfaces of the inner member and the outer member. A wheel mounting flange is integrally formed on a driving side of the inner and outer member to mount a wheel, via a brake rotor. A cylindrical pilot portion extends toward the outer side from the base of the wheel mounting flange. The pilot portion guides and supports the brake rotor. Through apertures are formed in order to temporarily mount the brake rotor on the wheel mounting flange. Hollow pins to temporarily mount the brake rotor, having a chamfered portion, are press-fit into the through apertures. The brake rotor can be temporally mounted on the wheel mounting flange by inserting or press-fitting the chamfered end sides of the pins into the insert apertures.

Thus, it is possible to hold the brake rotor in a rotation arresting condition relative to the wheel mounting flange. This is accomplished by inserting the through apertures of the brake rotor onto the hub bolts. The pins insert or press-fit easily and in a short period of time into the insert apertures due to the provision of the chamfered portion on each pin. Thus, this prevents the brake rotor from coming off the wheel mounting flange. In addition, since the pins are formed as hollow members, it is possible to suppress the press-fitting force. Thus, this prevents the deformation of the wheel mounting flange during press-fitting of the pins. Also, this assures the accuracy of surface run-out of the wheel mounting flange.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 8(a) is a front elevation view of a modification of the pin of FIG. 7a.

FIG. 8(b) is a plan view of the pin of FIG. 8(a).

DETAILED DESCRIPTION

One mode for carrying out the present disclosure includes a vehicle wheel bearing apparatus comprising an outer member integrally formed, on its outer circumference, with a body mounting flange. The outer member inner circumference includes double row outer raceway surfaces. An inner member includes a wheel hub and an inner ring. The wheel hub is integrally formed on one of its ends with a wheel mounting flange. The inner member outer circumference includes one inner raceway surface corresponding to one of the outer raceway surfaces. The wheel hub other end has a cylindrical portion. A cylindrical pilot portion extends toward the outer side from the base of the wheel mounting flange. The pilot portion guides and supports the brake rotor. A plurality of hub bolts is press fit on the wheel mounting flange equidistantly along its outer periphery. The inner ring is press fit onto the cylindrical portion of the wheel hub. The inner ring is formed with the other inner raceway surface which corresponds to the other of the double row outer raceway surfaces. Double row rolling elements are rollably contained between the double row inner and outer raceway surfaces of the inner member and the outer member. Through apertures are formed on the wheel mounting flange. Hollow pins, having a chamfered portion, are press-fit into the apertures. The brake rotor is formed with through apertures to receive the hub bolts and with insert apertures to receive the pins at positions respectively corresponding to the hub bolts and pins. The brake rotor can be temporally mounted on the wheel mounting flange by inserting or press-fitting the chamfered end sides of the pins into the insert apertures.

Preferable embodiments of the present disclosure will be hereinafter described with reference to the drawings.

Figure 1:
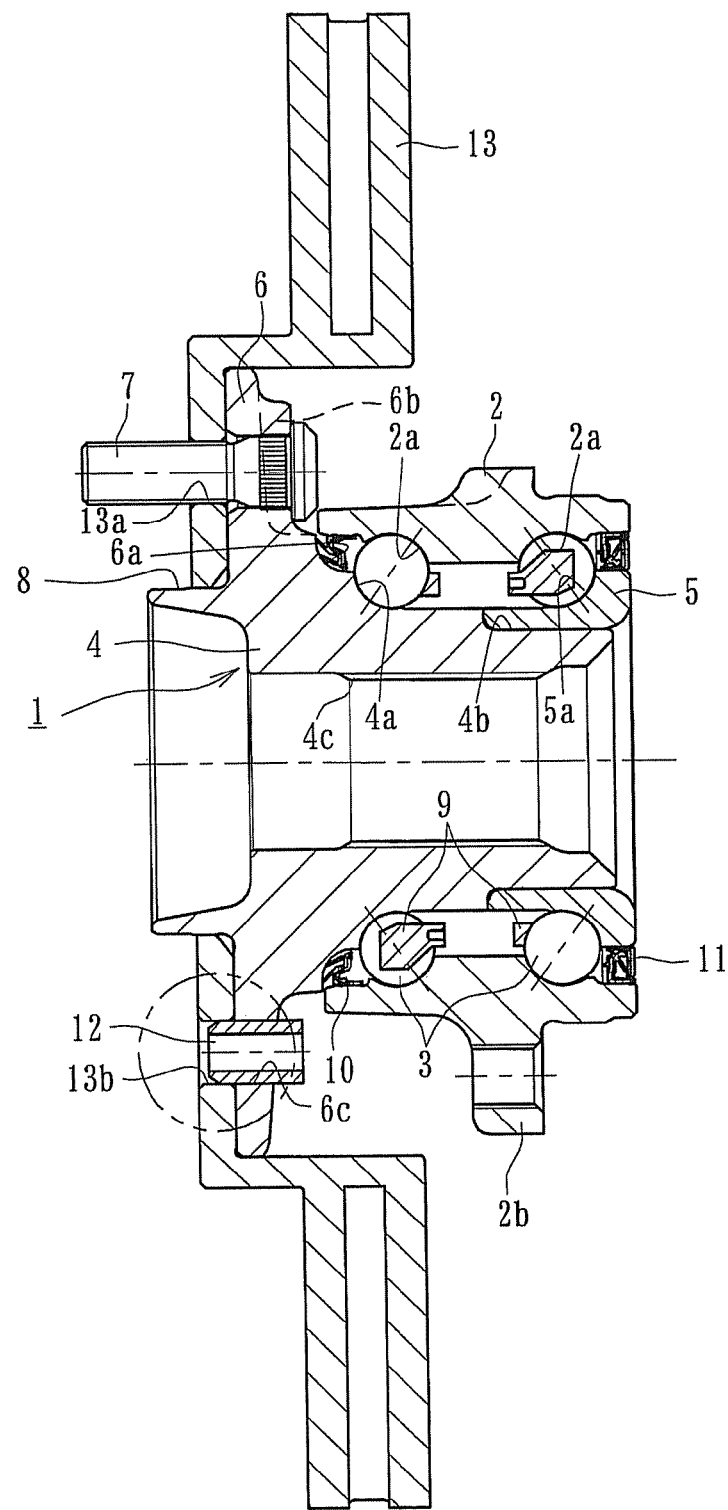
FIG. 1 is a longitudinal section view of a first embodiment of the vehicle wheel bearing apparatus.
Figure 2:
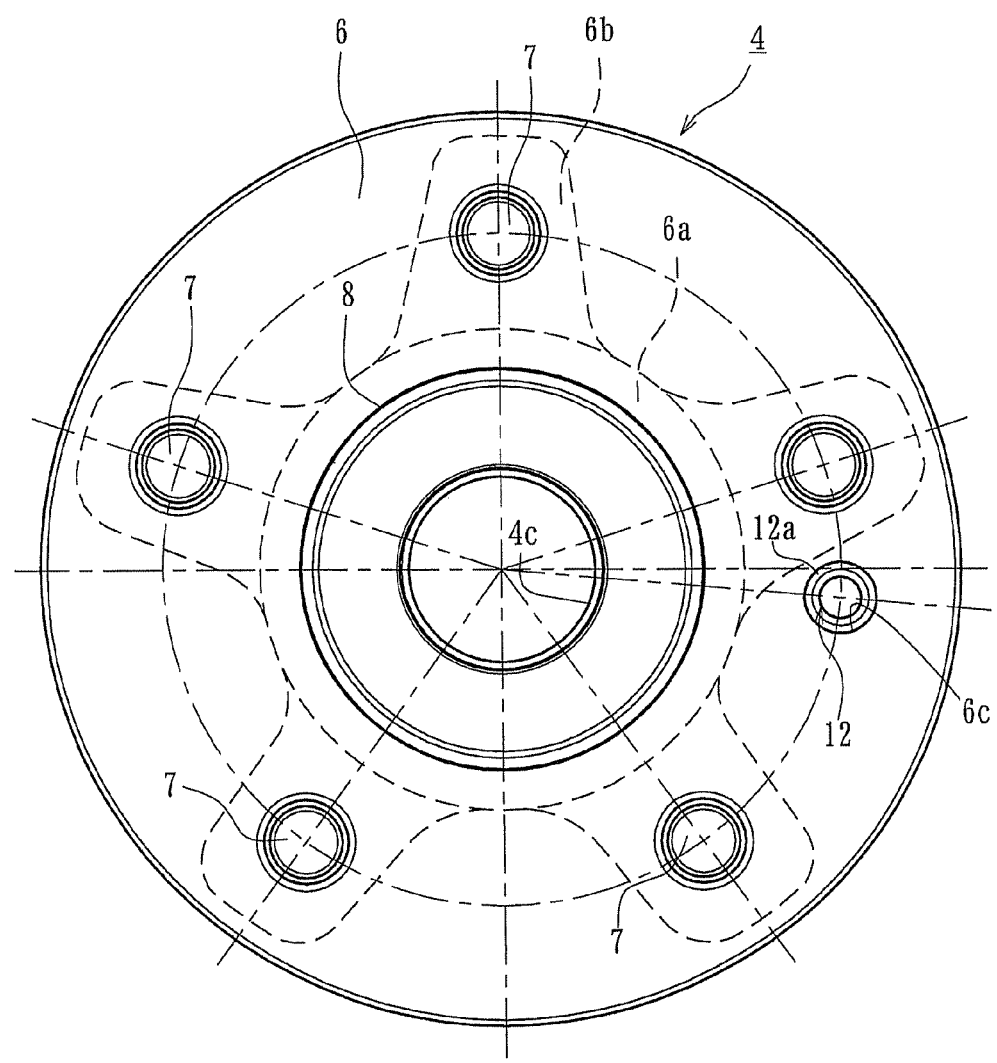
FIG. 2 is a front elevation view of the wheel hub of FIG. 1.
Figure 3:
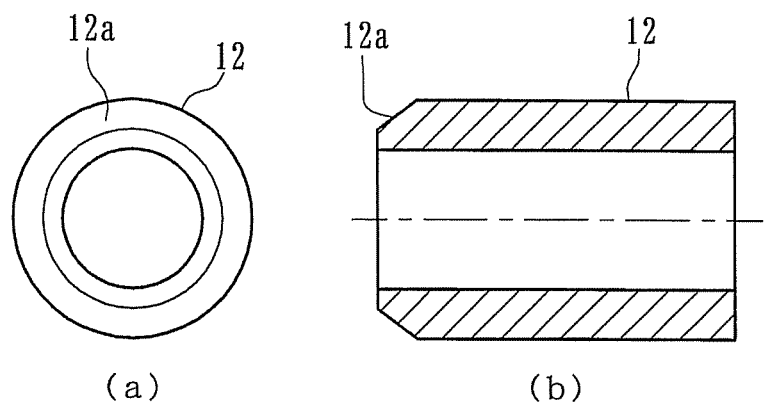
FIG. 3(a) is a front elevation view of a pin of FIG. 1.
FIG. 3(b) is a longitudinal section view of the pin of FIG. 3(a).
Figure 4:
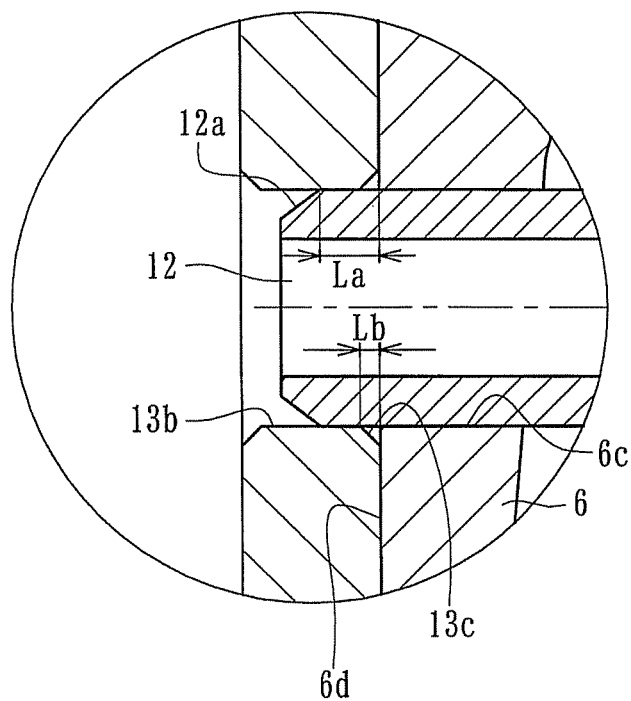
FIG. 4 is an enlarged view of an engaging portion of a pin of FIG. 1.

FIG. 1 is a longitudinal section view of a first embodiment of the vehicle wheel bearing apparatus. FIG. 2 is a front elevation view of a wheel hub of FIG. 1. FIG. 3(a) is a front elevation view of a pin of FIG. 1. FIG. 3(b) is a longitudinal section view of the pin. FIG. 4 is an enlarged view of an engaging portion of the pin of FIG. 1. In the description below, the term "outer side" of the apparatus denotes a side that is positioned outside of the vehicle body (left-side of FIG. 1). The term "inner side" of the apparatus denotes a side that is positioned inside of the body (right-side of FIG. 1) when the bearing apparatus is mounted on the vehicle body.

The vehicle bearing apparatus of the present disclosure is a third generation type that is used for a driving wheel. The bearing apparatus includes an inner member 1, an outer member 2, and double row rolling elements (balls) 3, 3. The inner member 1 includes a wheel hub 4 and an inner ring 5 press-fit onto the wheel hub 4.

The wheel hub 4 is integrally formed with a wheel mounting flange 6 at its one end. One (outer side) inner raceway surface 4a is formed on the wheel hub outer circumference. A cylindrical portion 4b axially extends from the inner raceway surface 4a. A serration (or spline) 4c is formed on the wheel hub inner circumference for torque transmission. The inner ring 5 is press fit onto the cylindrical portion 4b of the wheel hub 4, via a predetermined interference. The inner ring 5 is formed with the other (inner side) inner raceway surface 5a. Hub bolts 7 are arranged on the wheel mounting flange 6 equidistantly along its periphery. A cylindrical pilot portion 8 projects from the base of the wheel mounting flange 6. The pilot portion 8 radially guides and supports the wheel and the brake rotor 13.

The wheel mounting flange 6 is formed generally thin to reduce its weight. During forging, it is formed with a plurality of ribs 6b. The ribs 6b extend radially outward from a base 6a to increase the rigidity of the wheel mounting flange 6. The ribs 6b project toward the inner side and are formed with a petal configuration corresponding to the position of the hub bolts 7 (see FIG. 2).

The wheel hub 4 is formed from medium/high carbon steel including carbon of 0.40-0.80% by weight such as S53C. The wheel hub is hardened by high frequency induction quenching to include a region that extends from the inner raceway surface 4a to an inner side base 6a of the wheel mounting flange 6 to the cylindrical portion 4b. The base 6a forms a seal-land portion that receives the seal, via slide contact, from an outer side seal. The region is hardened to have a surface hardness of 58-64 HRC. The high frequency induction quenching can improve the strength of the wheel hub 4 and thus the durability of the wheel hub 4 and the inner ring 5. Fretting is suppressed in the fitted surfaces between the wheel hub 4 and inner ring 5. On the other hand the inner ring 5 is made of high carbon chrome steel, such as SUJ2, and is hardened to its core by dip quenching to have a surface hardness of 58-64 HRC.

The outer member 2 is integrally formed with a body mounting flange 2b on its outer circumference. The body mounting flange 2b is to be mounted on a body of a vehicle (not shown). The outer member inner circumference includes double row outer raceway surfaces 2a, 2a. The outer raceway surface 2a, 2a are positioned opposite to the inner raceway surfaces 4a, 5a of the inner member 1. Similar to the wheel hub 4, the outer member 2 is made from medium/high carbon steel including carbon of 0.40-0.80% by weight such as S53C. The double row outer raceway surfaces 2a, 2a are hardened by high frequency induction quenching to have a surface hardness of 58-64 HRC. Double row balls 3, 3 are contained between these outer and inner raceway surfaces 2a, 2a and 4a, 5a of the outer member 2 and the inner member 1. The balls 3, 3 are rollably held by cages 9, 9. Seals 10, 11 are mounted within annular openings formed between the outer member 2 and the inner member 1. The seals 10, 11 prevent leakage of grease contained in the bearing as well as the entry of rainwater and dust into the bearing from the outside.

Although shown with a double row angular contact ball bearing using balls as the rolling elements 3, 3, the present disclosure is not limited to such a bearing and may be applied to a double row tapered roller bearing using tapered rollers as the rolling elements 3, 3. In addition, although the shown structure is a so-called third generation type bearing structure where the inner raceway surface 4a is directly formed on the outer circumference of the wheel hub 4, the wheel bearing apparatus of the present disclosure is not limited to such a structure. The present disclosure may be applied to a bearing structure of a so-called second generation type where a pair of inner rings are press-fit onto a cylindrical portion of a wheel hub. Additionally, the disclosure may be applied to a bearing structure of a so-called fourth generation type where a wheel hub and an outer joint member are united and an inner raceway surface is directly formed on the outer circumference of the outer joint member.

A through aperture 6c is formed in the wheel mounting flange 6 of the wheel hub 4. A pin 12 is press fit into the through aperture 6c. The pin 12 is made of high carbon chrome steel such as SUJ2. The pin 12 is formed as a hollow member from a pipe shaped blank. The pin 12 is formed with a chamfered portion 12a on one end. The pin 12 may be made, for example, of blister steel such as SCr 420 or SCM415, cold-rolled steel (JIS SPCC group) or carbon steel such as S50C-S55C other than high carbon chrome steel. Although the pin 12 may be remained as original material without any heat treatment, it is possible to harden the pin 12 to have a surface hardness of 58-64 HRC by dip quenching to increase the mechanical strength and to prevent wear. When using blister steel, it is preferable to harden the pin, for example, by carburizing and quenching to have a surface hardness of 35-50 HRC.

As shown in FIG. 1, the brake rotor 13 is formed with through aperture 13a. The through aperture 13a position corresponds to the hub bolts 7. An insert aperture 13b is in a position corresponding to the pin 12. An inner diameter of each through aperture 13a is set larger than an outer diameter of the hub bolt 7. An inner diameter of the insert aperture 13b is set substantially the same as an outer diameter of the pin 12. Thus, the brake rotor 13 can be temporarily mounted on the wheel mounting flange 6 due to insertion or press-fitting of the tapered forward end of the pin 12 into the insert aperture 13b. The through apertures 13a of the brake rotor 13 oppose the hub bolts 7 and then the through apertures 13a are fit onto the hub bolts 7. That is, the brake rotor 13 can be temporarily mounted on the wheel mounting flange 6 easily and in a short period of time. This is accomplished only by opposing the through apertures 13a of the brake rotor 13 to the hub bolts 7 and then by fitting the through apertures 13a onto the hub bolts 7. The pin 12 is inserted or press-fit into the insert aperture 13b due to the provision of the chamfered portion 12a on the forward end of the pin 12. The brake rotor 13, once temporarily mounted on the wheel mounting flange 6 via the press-fit engagement between the pin 12 and the insert aperture 13b, will not come off from the wheel mounting flange 6.

Since the pin 12 is hardened treated, it is possible to prevent the pin 12 from being broken by a shearing force applied to the pin 12 by the brake rotor 13. Thus, this improves the durability of the pin 12. In addition, since the pin 12 has a hollow configuration, it is possible to reduce the press-fitting force. Thus, this prevents deformation of the wheel mounting flange 6 during press-fitting of the pin 12. Accordingly, it is possible to assure the accuracy of surface run-out of the outer side surface 6d of the wheel mounting flange 6 where the brake rotor 13 is mounted.

As shown in FIG. 4, a dimension "La", is a depth from the outer side surface 6d of the wheel mounting flange 6 to the chamfered portion 12a of the pin 12, is set so that it is larger than a dimension "Lb" the depth of the chamfered portion 13c of the brake rotor 13 (La>Lb). This makes it possible to support the shearing force applied to the pin 12 from the brake rotor 13 by the cylindrical surface of the pin 12. Thus, this prevents the generation of component force causing lift of the brake rotor 13 from the wheel mounting flange 6. Accordingly, it is possible to obtain a stable temporary mount of the brake rotor 13 without causing pulling off of the brake rotor 13 from the wheel mounting flange 6.

Figure 5:
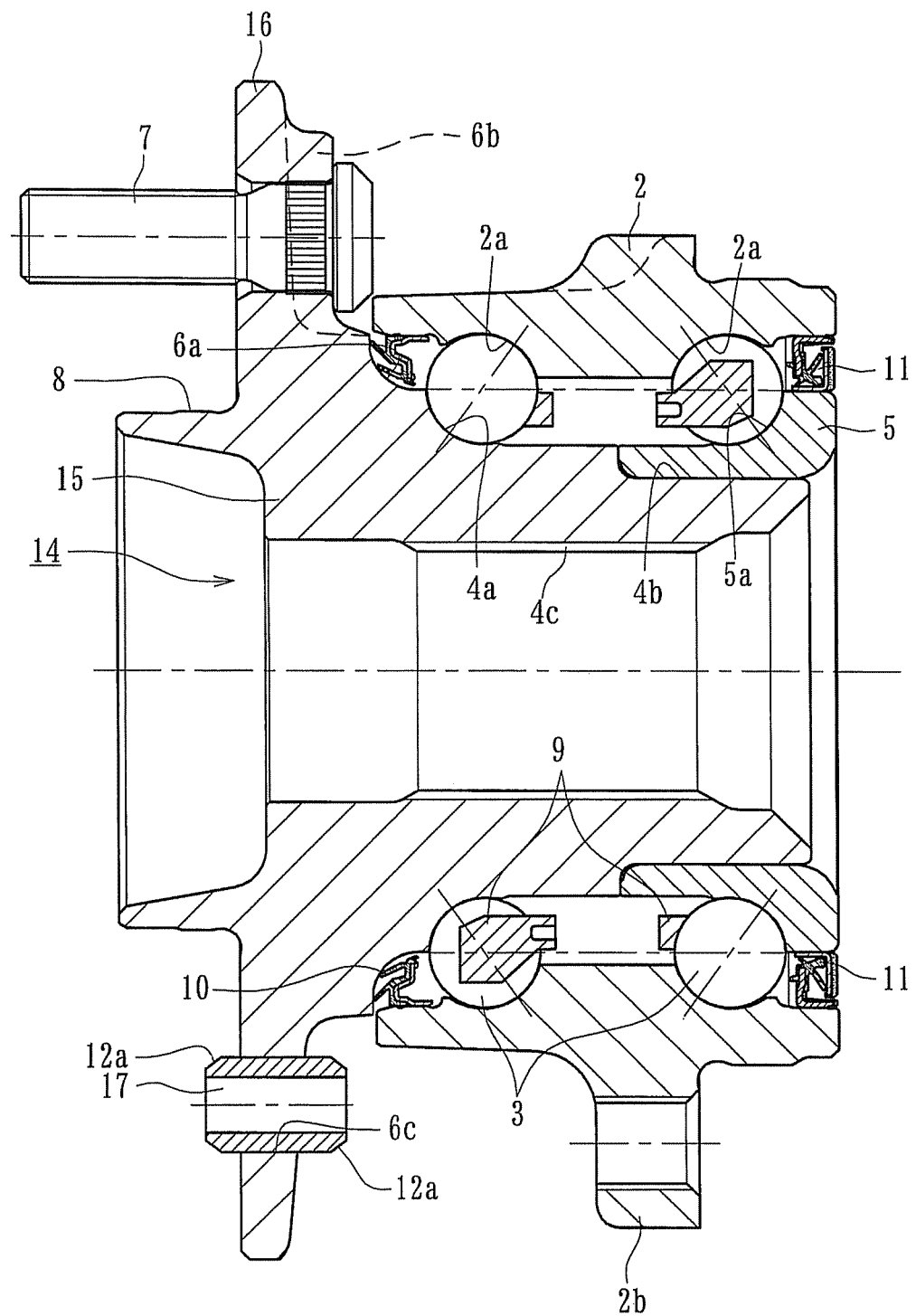
FIG. 5 is a longitudinal section view of a second embodiment of the vehicle wheel bearing apparatus.
Figure 6:
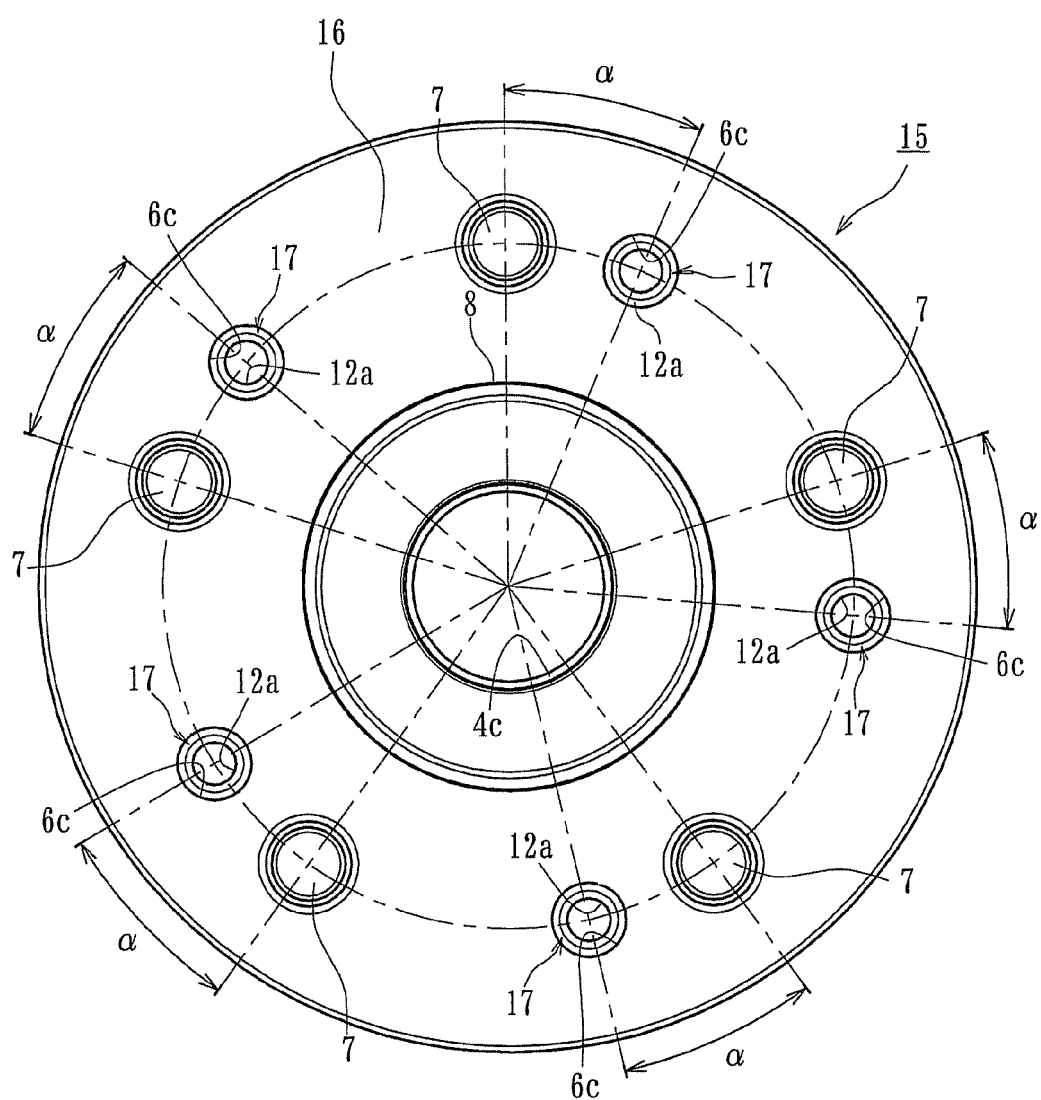
FIG. 6 is a front elevation view of FIG. 5.

FIG. 5 is a longitudinal section view of a second embodiment of the vehicle wheel bearing apparatus. FIG. 6 is a front elevation view of FIG. 5. FIG. 7a is a front elevation view of a pin of FIG. 5. FIG. 7(b) is a longitudinal section view of the pin. FIG. 8(a) is a front elevation view of a modification of the pin of FIG. 7(a). FIG. 8(b) is a plan view of FIG. 8a.

The second embodiment is basically different from the first embodiment only in the structure and the number of pins. Accordingly, the same reference numerals that are used in this embodiment designate the same portions, same parts or same functions as those in the first embodiment. Thus, the detail description of them will be omitted.

The vehicle wheel bearing apparatus of this embodiment is a third generation type used for a driving wheel. The apparatus has an inner member 14, an outer member 2, and double row rolling elements (balls) 3, 3. The inner member 14 includes a wheel hub 15 and an inner ring 5 press-fit onto the wheel hub 15.

The wheel hub 15 is integrally formed with a wheel mounting flange 16 at its one end. One inner raceway surface 4a is formed on the wheel hub outer circumference. A cylindrical portion 4b axially extends from the inner raceway surface 4a. A serration 4c is formed on the wheel hub inner circumference for torque transmission.

Figure 7:
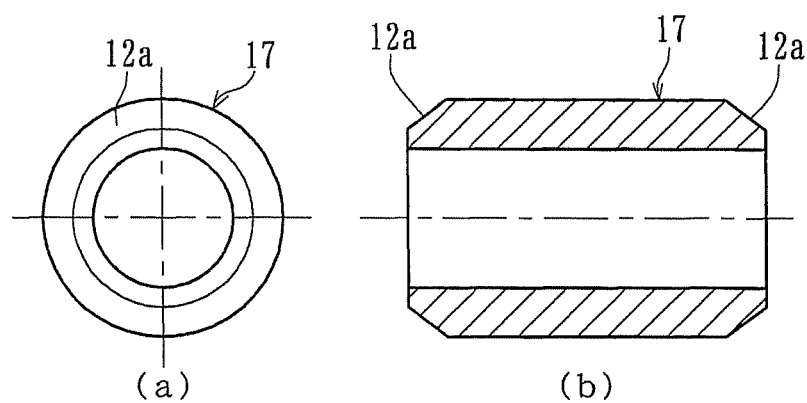
FIG. 7(a) is a front elevation view of a pin of FIG. 5.
FIG. 7(b) is a longitudinal section view of the pin of FIG. 7(a).

As shown in FIG. 6, a plurality of through apertures 6c are formed in the wheel mounting flange 16 of the wheel hub 15. Through apertures 6c are formed at positions spaced apart from the hub bolts 7 by a predetermined phase angle α. Pins 17 are press-fit into the through apertures 6c via a predetermined interference. The pins 17 are made of high carbon chrome steel such as SUJ2 and hardened to have a surface hardness of 58-64 HRC by dip quenching to increase their mechanical strength. As shown in FIG. 7, each pin 17 is made from a pipe shaped blank. The pin 17 has a hollow configuration formed with chamfered portions 12a, 12a on its both ends.

According to the second embodiment, since the same chamfered portions 12a, 12a are formed on both ends of each pin 17, it is possible to press-fit the pin 17 into the through aperture 6c of the wheel mounting flange 16 without paying any attention to the orientation of the pin 17. Thus, this further simplifies the press-fit operation of the pin 17 as compared with the pins 12 of the first embodiment having the chamfered portion 12a on one end. In addition, the number of the pins 17 correspond to the number of the hub bolts 7. Each pin17 is press-fit at a position away from the hub bolt 7 by the same phase angle. Thus, it is possible to prevent a rotational imbalance of the wheel hub 15. Thus, this improves the rotational accuracy.

Figure 8:
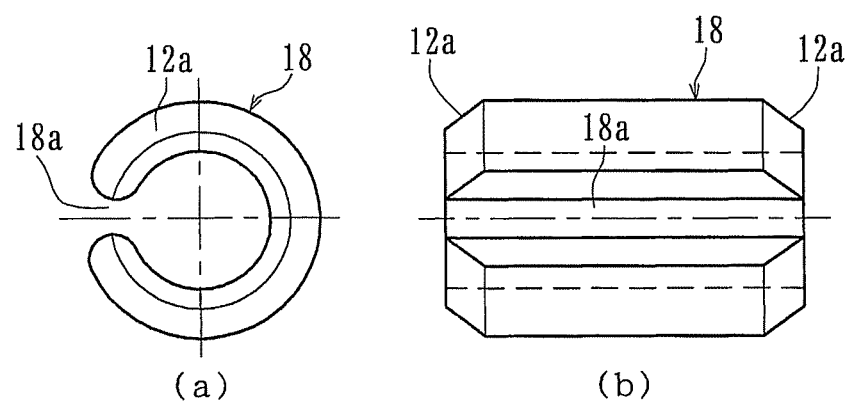
Figure 9:
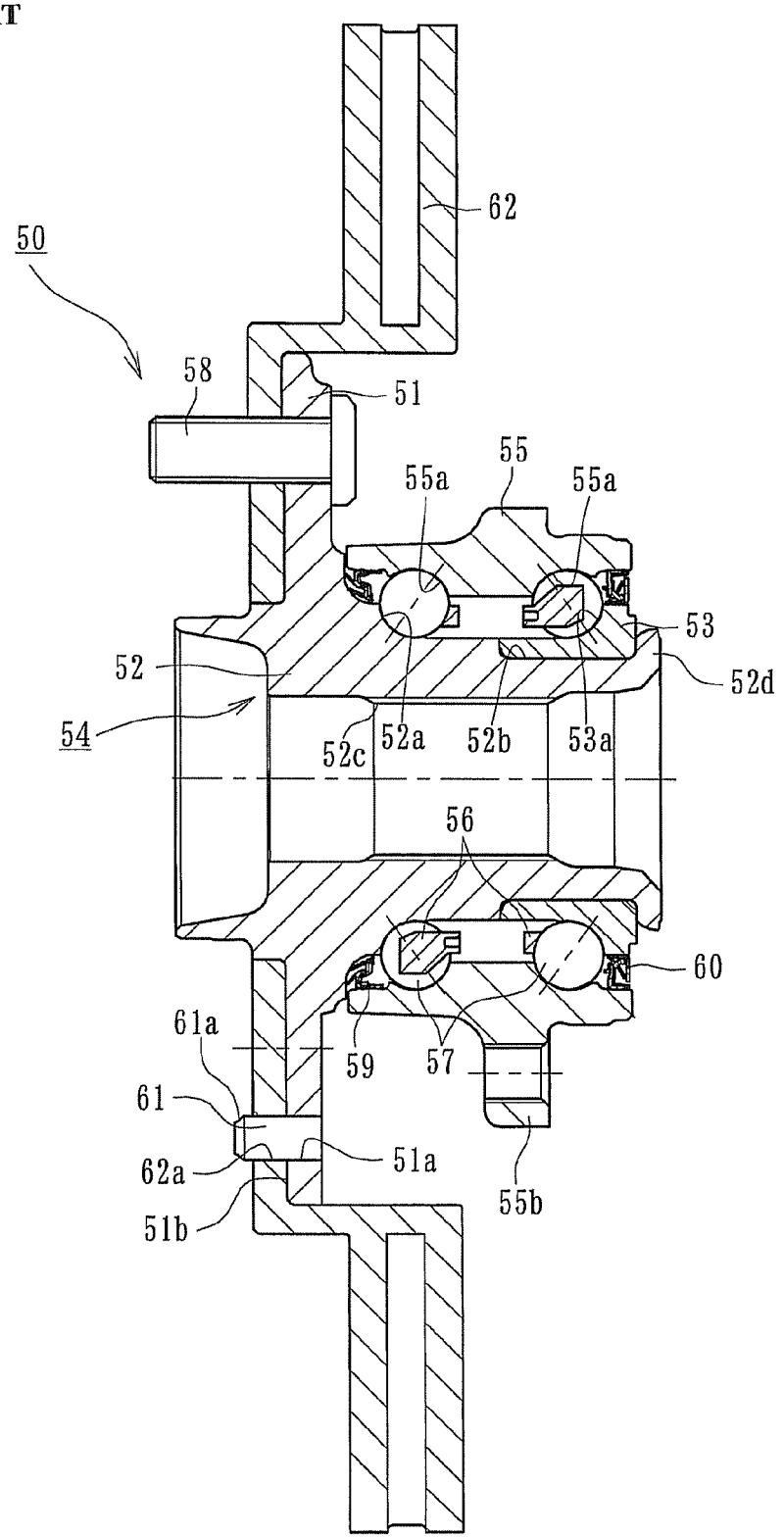
FIG. 9 is a longitudinal section view of a prior art vehicle wheel bearing apparatus.

One modification of the pin is shown in FIG. 8. This pin 18 is a so-called spring pin made by press working of spring steel. It is heat treated to have a surface hardness of 45-50 HRC. The surface of pin 18 is phosphate treated. The pin 18 has an axially extending slit 18a and the same chamfered portions 12a, 12a on both its ends. The provision of the slit 18a enables an easy insertion of the pin 18 into the insert apertures of the brake rotor (not shown) in a short period of time. Thus, this prevents deformation of the wheel mounting flange during press-fitting of the pin 18. Also, similar to the second embodiment, since the same chamfered portions 12a, 12a are formed on both ends of each pin 18, it is possible to easily press-fit the pin 18 into the through aperture of the wheel mounting flange 16 in a short period of time without paying any attention to the orientation of the pin 18. In addition, it is also possible to reduce the manufacturing cost by adopting pins 18 of standard articles not requiring any machining. Furthermore, it is possible to improve the mechanical strength of the pin and to assure its durability for a long term by adopting, as material of the pin, stainless steel such as SUS304 rich in corrosion resistance.

The present disclosure has been described with reference to the preferred embodiments. Obviously, modifications and alternations will occur to those of ordinary skill in the art upon reading and understanding the preceding detailed description. For example, it is possible to adopt an outer ring rotation type where the wheel mounting flange is integrally formed on an outer member. It is intended that the present disclosure be construed to include all such alternations and modifications insofar as they come within the scope of the appended claims or their equivalents.

The present disclosure can be applied to a wheel bearing apparatus of any one of the second through fourth generation types having an inner member integrally formed on its one end with a wheel mounting flange to mount a wheel of a vehicle, via a brake rotor, to be temporarily mounted on the wheel mounting flange.

The description of the disclosure is merely exemplary in nature and thus, variations that do not depart from the gist of the disclosure are intended to be within the scope of the disclosure. Such variations are not to be regarded as a departure from the spirit and scope of the disclosure.

What is claimed is:

1. A vehicle wheel bearing apparatus comprising:
an outer member integrally formed with double row outer raceway surfaces on its inner circumference;
an inner member formed with double row inner raceway surfaces on its outer circumference, the double row inner raceway surfaces are arranged opposite to the double row outer raceway surfaces;
double row rolling elements are rollably contained, via cages, between the double row inner raceway surfaces and the double row outer raceway surfaces of the inner member and the outer member;
a wheel mounting flange is integrally formed on a driving side of the inner member and outer member for mounting a wheel via a brake rotor, a cylindrical pilot portion extends toward the outer side from a base of the wheel mounting flange to guide and support the brake rotor;
a plurality of hub bolts are press fit onto the wheel mounting flange equidistantly along an outer periphery of the wheel mounting flange;
at least one through aperture is formed on the wheel mounting flange, at least one hollow pin, with a chamfered portion, is press-fit into the through aperture, the brake rotor is formed with through apertures to receive the plurality of hub bolts of the wheel mounting flange, the brake rotor further comprising at least one insert aperture, receiving the at least one hollow pin, is at a position respectively corresponding to the plurality of hub bolts and the at least one hollow pin, a chamfered portion is formed on an inner side of the at least one insert aperture of the brake rotor and a dimension from the outer side surface of the wheel mounting flange to the chamfered portion of the pin is set so that it is larger than a dimension of the chamfered portion of the brake rotor, the brake rotor is temporarily mounted on the wheel mounting flange by inserting or press-fitting the chamfered end side of the at least one hollow pin into the at least one insert aperture.

2. The vehicle wheel bearing apparatus of claim 1, wherein the at least one hollow pin comprises a plurality of hollow pins corresponding to the number of the hub bolts and each hollow pin is press-fit at a position away from the hub bolt by a same phase angle.

3. The vehicle wheel bearing apparatus of claim 1, wherein chamfered portions are formed on both ends of the at least one hollow pin.

4. The vehicle wheel bearing apparatus of claim 1, wherein the at least one hollow pin is hardened by a heat treatment.

5. The vehicle wheel bearing apparatus of claim 1, wherein the at least one hollow pin is a spring pin having an axially extending slit.

6. The vehicle wheel bearing apparatus of claim 1, wherein the at least one hollow pin is formed from a blank of a pipe member.

7. The vehicle wheel bearing apparatus of claim 1, wherein the at least one hollow pin is formed from stainless steel.

8. The vehicle wheel bearing apparatus of claim 1, wherein the surface of the at least one hollow pin is phosphate treated.

9. A vehicle wheel bearing apparatus comprising:
an outer member integrally formed with double row outer raceway surfaces on its inner circumference;
an inner member formed with double row inner raceway surfaces on its outer circumference, the double row inner raceway surfaces are arranged opposite to the double row outer raceway surfaces;
double row rolling elements are rollably contained, via cages, between the double row inner raceway surfaces and double row outer raceway surfaces of the inner member and the outer member;
a wheel mounting flange is integrally formed on a driving side of the inner and outer member for mounting a wheel via a brake rotor, a cylindrical pilot portion extends toward the outer side of the wheel bearing from a base of the wheel mounting flange to guide and support the brake rotor;
at least one through aperture is formed in the wheel mounting flange and at least one insert aperture is formed in the brake rotor, in order to temporarily mount the brake rotor to the wheel mounting flange at least one hollow pin, with a chamfered portion, is press-fit into the apertures the pin projects in an axial direction toward an inner side of the wheel bearing from an inner side surface of the wheel mounting flange; and
a chamfered portion is formed on an inner side of the at least one insert aperture of the brake rotor and dimensions are set so that a depth of the brake rotor chamfered portion is smaller than a depth from the outer side surface of the wheel mounting flange to the chamfered portion of the at least one hollow pin.

10. The vehicle wheel bearing apparatus of claim 9, wherein a plurality of hub bolts are mounted on the wheel mounting flange equidistantly along the wheel mounting flange outer periphery.

11. The vehicle wheel bearing apparatus of claim 9, wherein the brake rotor is formed with through apertures to receive a plurality of hub bolts of the wheel mounting flange, the through apertures and insert aperture being at positions respectively corresponding to the hub bolts and the at least one hollow pin, the chamfered end side of the at least one pin being inserted or press-fit into the at least one insert aperture.

12. The vehicle wheel bearing apparatus of claim 9, wherein the at least one hollow pin comprises a plurality of hollow pins corresponding to a number of hub bolts and each hollow pin is press-fit at a position away from the hub bolt by a same phase angle.

13. The vehicle wheel bearing apparatus of claim 12, wherein chamfered portions are formed on both ends of each hollow pin.

14. The vehicle wheel bearing apparatus of claim 9, wherein the at least one hollow pin is hardened by a heat treatment.

15. The vehicle wheel bearing apparatus of claim 9, wherein the at least one hollow pin is a spring pin having an axially extending slit.

16. The vehicle wheel bearing apparatus of claim 9, wherein the at least one hollow pin is formed from a blank of a pipe member.

17. The vehicle wheel bearing apparatus of claim 9, wherein the at least one hollow pin is formed from stainless steel.

18. The vehicle wheel bearing apparatus of claim 9, wherein the surface of the at least one hollow pin is phosphate treated.

* * * * *